United States Patent [19]

Baitinger et al.

[11] Patent Number: 4,645,710

[45] Date of Patent: Feb. 24, 1987

[54] FOAM LAMINATE STRUCTURES

[75] Inventors: Stacey A. Baitinger; Robert C. Brothers; Kenneth T. Dishart, all of Wilmington, Del.

[73] Assignee: E. I. Du Pont de Nemours and Company, Wilmington, Del.

[21] Appl. No.: 780,075

[22] Filed: Sep. 25, 1985

[51] Int. Cl.$^4$ ............................ B32B 7/12; B32B 3/26
[52] U.S. Cl. .............................. 428/317.7; 428/319.1; 428/319.7
[58] Field of Search ............... 428/317.1, 317.5, 317.7, 428/314.4, 314.8, 318.4, 319.1, 319.3, 319.7, 319.9, 420

[56] References Cited

U.S. PATENT DOCUMENTS

| 3,080,267 | 3/1963 | Schmalz | 428/319.3 |
| 3,533,901 | 10/1970 | Sutker | 428/318.4 |
| 3,873,407 | 3/1975 | Kumata et al. | 428/318.6 |

Primary Examiner—William J. Van Balen

[57] ABSTRACT

Laminate structures comprising a foamed polyurethane or polyisocyanurate resin core with a facer material uniformly adhered thereto with an adhesive material having functional groups capable of interacting chemically with isocyanate groups in the foamed resin core are disclosed. Suitable adhesive materials include α-olefin-acid copolymers, ethylene vinyl alcohol, polyimides, polyamines and phenolic resins. The bond between the foam core and the facer material has a peel strength of at least 1.5 lbs/in., preferably 5 lbs/in.

15 Claims, No Drawings

FOAM LAMINATE STRUCTURES

BACKGROUND OF THE INVENTION

This invention relates to novel laminate structures of polyurethane or polyisocyanurate resin foam structures and various facer materials. The peel strength of the bond between the foam and facer material in these novel structures is uniformly at least about 1.5 lbs/in. The invention also relates to processes for preparing these laminate structures.

The use of foamed plastic material for insulating purposes in building structures such as exterior or partition walls, bulk heads, ceilings, floors, storage tanks and roof structures is well known as such foamed plastic materials have a very low thermal conductivity. Polyurethane and polyisocyanurate foams offer excellent insulating efficiency (R value) versus other insulating products, but it has been found that the insulating efficiencies of these products tend to decrease with aging. It is believed that this R value decay is due to the permeation of air into the foam cells. The blowing agents typically used in the manufacture of these foams stay trapped in the cells of the foam structure because of their molecular size and low permeation rates. Air, on the other hand, has a high permeation rate compared to the blowing agents and enters the cells, mixing with the blowing agents. Since air has a much higher vapor thermal conductivity than the blowing agents, the R value of the foam is thereby decreased.

In attempts to avoid this problem, the foams can be faced with materials which serve as gas barriers. Typical facer materials include metal foils such as aluminum. Pinholing of the foil facer, damage to the foil during construction and poor adhesion of the foil to the foam surface, however, are factors which allow air to nonetheless reach the foam surface. In order to benefit from the excellent insulating qualities of polyurethane and polyisocyanurate foams, a method for avoiding the aforementioned problems is needed.

BRIEF DESCRIPTION OF THE INVENTION

It has now been found that excellent adhesion of facer materals to foam materials may be attained by the use of certain adhesive materials. This invention therefore relates to a laminate structure comprising a core in the form of a foamed polyurethane or polyisocyanurate resin and a facer material bonded to at least one face thereof with an adhesive material having functional groups capable of interacting chemically with isocyanate groups in the foam system, the peel strength of the bond between the core and the facer material being at least about 1.5 lbs/in, preferably at least about 5 lbs/in.

DETAILED DESCRIPTION

The foamed materials useful in the laminate structure of this invention include foams of polyurethane and polyisocyanurate resins. The chemical compositions of these foams can vary over a wide range, not only as to the polymeric material per se, but also as to other additives and supplemental agents that may be present, such as surfactants, catalysts, cell control agents, plasticizers, fillers, blowing agents and fire retardants. The compositions of these foams is already known and the blending, mixing and formation thereof is familiar to those skilled in the art. Suitable facer materials are those which can provide a barrier against air and are known in the art. Examples of such materials include metal foils, such as aluminum foil, paper, and certain polymer films such as polyamide, polyesters, and polyvinylidene chloride films. Also suitable are combination structures of metal foils with paper or polymer films (e.g., foil/paper laminates) and vacuum metallized polymer films. The thickness of the facer material is not critical and can be varied within relatively wide ranges, e.g. 0.5 to 10 mils or more.

The foam core may be faced with facer material on one or more sides. Obviously, if the facer material is to serve as a gas barrier, it will be preferable to face the foam core on all sides open to the air.

The facer material is coated on the side which is to be adjacent to the foam core with an adhesive material. The preferred method of coating the facer material with adhesive is by extrusion coating which generally provides excellent adhesion of the adhesive to the facer material.

The adhesive materials useful in this invention are those capable of adhering the facer material to the foam core and having functional groups capable of interacting chemically with isocyanate groups in the foam material. Functional groups capable of interacting chemically with isocyanate groups include acid, hydroxyl, amide, and amine groups. Examples of such materials are: α-olefin-acid copolymers, ethylene vinyl alcohol, polyamides such as nylon, phenolic resins and polyamines.

The α-olefin-acid copolymers are random, block and graft copolymers of (a) a major proportion of an α-olefin of the general formula $RCH=CH_2$, where R is hydrogen or an alkyl group of 1 to 8 carbon atoms and (b) an α,β-ethylenically unsaturated carboxylic acid group having preferably 3 to 8 carbon atoms. Generally, the concentration of α-olefin in these copolymers is at least 50 mole percent, preferably greater than 80 mole percent, and the concentration of acidic monomer is from 0.2–25 mole percent, preferably from 1 to 10 mole percent, said mole percentages being based on total polymer. Examples of α-olefins include ethylene, propylene, butene-1, pentene-1, hexene-1, heptene-1, 3-methylbutene-1, and 4-methylpentene-1. Examples of acidic monomers include acrylic acid, methacrylic acid, ethacrylic acid, itaconic acid, maleic acid, fumaric acid, and monoesters of said dicarboxylic acids, such as methyl hydrogen maleate, methyl hydrogen fumarate, ethyl hydrogen fumarate and maleic anhydride. These α-olefin-acid copolymers and their methods of preparation are well known in the art. The disclosures of U.S. Pat. Nos. 3,264,272, 3,404,134, 3,355,319 and 4,321,337 are relevant to such copolymers and are hereby incorporated by reference.

The preferred adhesive polymers for use in this invention are α-olefin-acid copolymers and, specifically, ethylene-methacrylic acid or ethylene-acrylic acid copolymers with acid content of about 1 to 20 weight %, preferably about 7 to 12 weight %, and terpolymers of ethylene, maleic anhydride and esters of acrylic acid such as ethyl acrylate. These polymers are preferred for reasons of cost, availability and performance.

It is believed that the exceptional strength achieved in the bond between the foam material and the facer material in the laminate structure of this invention is a result of the chemical interaction of free isocyanate groups in the foam material with the pendant acid, hydroxy or other functional groups. For example, isocyanate groups in the foam material and carboxylic acid groups in α-olefin acid copolymer or hydroxy groups in ethylene vinyl alcohol could react as follows:

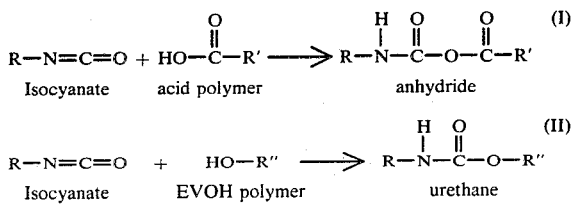

To achieve the strong bond between foam and facer, the laminate structure must be prepared under conditions to allow for chemical interaction of the type described above.

In the preferred method of preparing the laminate structure of this invention, the prefoam chemicals are placed in contact with the coated side of an adhesive polymer-coated facer material and are allowed to foam in contact with said adhesive coating. The term "prefoam chemicals" is used to mean the chemicals which will react to form the foam core of the laminate structure of this invention. For example, for a polyurethane foam the prefoam chemicals might be the isocyanate and polyol which polymerize to form the polyurethane as well as blowing agent, and other additives such as catalysts, cell control additives, etc. The components of the foam systems used herein and the methods for foaming them will not be described in detail as they are well known. The foaming will preferably proceed under ambient temperature and pressure conditions although elevated temperatures and pressures could be applied. It has been found that the bond between the foam and the adhesive is generally completely cured within about twenty-four hours after contacting the prefoam chemicals with the adhesive-coated facer material. Foam board products can be made on a continuous foam board line, formed in a mold, or foamed in place between spaces internally coated with resin such as in the manufacture of refrigerator enclosures.

Prior to contacting it with the prefoam chemicals, one side of the facer material is coated with adhesive material. It is important that the facer material be evenly coated with adhesive to provide a uniformly strong bond between foam core and facer. An adhesive coating having a thickness in the range of about 0.1 to 1 mil will generally be sufficient. The adhesive will generally be extrusion coated onto the facer material, and it has been found to be preferable to extrude adhesive at as high a temperature as possible without degrading the polymer. This temperature for the preferred ethylene methacrylic acid copolymer adhesives would be about 300° C.

Another method for preparing the laminate structures of this invention involves contacting the already formed foam core, adhesive and facer material and subjecting them to contact pressure and heat conditions sufficient to allow for the chemical interaction between the foam core and the adhesive polymer. Generally, this would involve contacting the foam core and the adhesive-coated facer material at temperatures in the range of about 100 to 300° C under pressure conditions of about 1 to 50 psi for about 1 to 10 seconds. This method is obviously less advantageous than the previously described "pre-foam" method which can be performed at ambient temperature and pressure conditions.

The foam to facer material bond in the laminate structures of this invention possess exceptional peel strength, and it is believed that this excellent adhesion will lead to an improvement in the R-values of polyurethane and polyisocyanurate insulating materials with aging. It is also known that the adhesive material serves to seal pinholes in the facer materials that can also lead to permeation of air into the foam core. It is essential for these purposes that the adhesion of the facer material to the foam be uniform over the entire surface of the foam core. In other words, the advantages obtained by the exceptional peel strength of the foam to facer bond can be offset if that bond is not strong enough over the entire surface of the foam to prevent the disruptions which can allow air to reach the foam surface.

The peel strength of the bond between the foam core and the facer material in the laminate structures of this invention is at least about 1.5 lbs/in, and preferably at least about 5 lbs/in. The peel strength is determined by the procedure described below, a standard and widely used test.

Test for Determining Peel Strength

1. Test Sample:
1.1 Sample should be representative of material being tested.
1.2 Test 5 specimens. .
1.3 Score three strips 25.4 mm wide and 127 mm long on the surface of the facer. If the test sample is of a material faced on two sides, take strips from both sides for a better profile of bond strength.
2. Conditioning:
2.1 Standard conditions. Store specimens at 23°±2° C. (73.4±3.6° F.) and 50% relative humidity for not less than 24 hours.
2.2 End use conditioning. Store specimens at the specific end use of temperature and humidity for not less than 24 hours.
3. Procedure:
3.1 Separate the facer from the foam with a sharp object to separate the layers sufficiently to start delamination. Clamp the free ends of the specimen in the Instron tensile testing machine; making sure the sample separation line is parallel so the clamps and the tail of the specimen is facing away from the testing machine.
3.2 After the loose ends of the specimen are secured in the jaws, activate the Instron tensile testing machine. Maintain the tail of the specimen at a 90° angle to the plane of the clamps. Run tests at 30.5 cm/min.±10% jaw separation.
Note: In some cases the sample may be particularly fragile and the rate of jaw separation will have to be reduced. If a greater characterization of the bond strength is desired, the jaw separation may be run at several different rates.
4. Calculation of Peel Strength
The peel strength is measured in lbs./inch for each specimen; peel strength for a given sample is calculated by averaging the values obtained for all five specimens.

The following examples are provided to illustrate the invention.

EXAMPLE 1

Aluminum foil faced rigid polyurethane foam specimens for facer adhesion studies were prepared using a commercial two component liquid foam system (Isofoam PE-2 manufactured by Isocyanate Products, Inc. of New Castle, Del.) designed for pour-in-place insulation applications. Component A of this system, a toluene diisocyanate/polyether polyol prepolymer with cell control additive, was mixed in equal parts according to manufacturer's directions, with Component B, a combination of polyol, catalyst and trichlorofluoromethane. This mixture was immediately poured onto 8 inch square sheets of 2 mil aluminum foil sufficient to obtain a 4 inch diameter circle of liquid near the center of each foil sheet. When the liquid began to rise, a matching sheet of foil was placed over the rising foam circle to produce a rigid foil/foam/foil structure when cured. Two sets of specimens were prepared. One set used foil pieces cut from 2 mil roll stock that had been previously extrusion coated on one side with a 1 mil thickness of an ethylene methacrylic acid copolymer resin containing 8.7 wt % o methacrylic acid (Nucrel ® 0910 resin, E. I. du Pont de Nemours and Company, Wilmington, Del.); the foam liquid system was poured and cured on the resin coated side of the foil. The second set of specimens was prepared with foil pieces cut from uncoated 2 mil roll stock—these pieces were cleaned in a fluorocarbon solvent degreasing system to remove any surface oils prior to foam pouring. After curing, the foil/foam/foil specimens were tested for foil to foam adhesion strength using an Instron tester in which 1 inch strips of foil facer were pulled away from the foam with the following results:

| | Peel Strength Average Load, Pounds Per Inch of Facer Width |
|---|---|
| Uncoated Foil Facers | 0.165 + 0.04 SDV |
| Coated Foil Facers | 7.58 + 0.98 SDV |
| | (SDV = Standard Deviation) |

EXAMPLE 2

Using the same foam system described in Example 1, larger rigid foil/foam/foil specimens were prepared using a box mold constructed of ½ inch aluminum plates with inside dimensions of 15.5×13×2.5 inches. The inside surfaces of the 15.5×13 inch plates were lined with either the ethylene/methacrylic acid copolymer resin extrusion coated foil or the uncoated foil facers described in Example 1. The box mold was placed in a vertical position and the liquid foam mixture was poured into the top, open end, of the box in sufficient quantity to completely fill the mold after expansion. When the rising foam reached the top of the box, the end plate was installed and the foam allowed to cure for one hour and then the box was disassembled and the foil faced foam specimen removed. Adhesion of the foil facers was examined by pulling back 1 inch wide strips of facer by hand. The uncoated foil facers peeled easily and cleanly from the foam surface and this poor adhesion did not improve with further curing time. The ethylene-methacrylic acid copolymer resin coated foil facers peeled much less easily than the uncoated foils after the 1-hour curing time. After 24 hours, the adhesion further improved and after 48 hours cure, it was difficult to pry the foil loose and the foam tore apart rather than separate from the foil.

EXAMPLE 3

The foil faced foam specimens of Example 2 were prepared in the same manner except the assembled mold with foil facers in place was preheated in an oven to 60° C (140° F. and the liquid foam mixture poured into this 60° C. mold. Adhesion of the foil to the foam was examined in the same manner as described in Example 2. After 48 hours curing, the uncoated foil facers were easily peeled away from the foam while the ethylene-methacrylic acid copolymer extrusion coated foil was bonded tightly to the foam and could not be removed without destruction of the foam.

EXAMPLE 4

The 8-inch square foil faced foam specimens were prepared as described in Example 1 except that the ethylene-methacrylic acid copolymer resin coating was applied to the alumina foil from an aqueous dispersion of the resin using a wire wound rod applicator. This aqueous dispersion (56220 Surlyn ®Ionomer Dispersion, E. I. du Pont de Nemours and Company, Wilmington, Del.) contained 31 wt % of resin solids which consisted of an ethylene-methylacrylic acid copolymer containing 15 wt % methacrylic acid of which 46% of the free acid groups were present as their potassium ion salts. Coatings were applied at different levels and air dryed. Foil/foam/foil specimens prepared with uncoated foil facers and with these coated foil facers were tested for foil to foam adhesion strength with the following results:

| | | INSTRON FACER PEEL TESTS | |
|---|---|---|---|
| | | Pounds/Inch | Standard Deviation |
| Uncoated Foil Facers | | | |
| Specimens: | No 1 | 0.23 | 0.02 |
| | No 2 | 0.31 | 0.01 |
| | No 3 | 0.27 | 0.02 |
| | No 4 | 0.22 | 0.02 |
| Coated Foil Facers | | | |
| Dry Coating Wt. Lbs/Ream | Thickness Mil | | |
| 2.0 | 0.1 | 1.58 | 0.21 |
| 4.1 | 0.3 | 1.60 | 0.08 |
| 5.5 | 0.4 | 1.56 | 0.16 |

It is believed that the peel strengths of the foam to foil bonds in this Example 4 are not as great as the peel strengths in Examples 1–3 because the ethylene-methacrylic acid copolymer resin was not extrusion coated onto the foil as in the previous examples. Extrusion coating provides better adhesion of the resin coating to the foil than does application of an aqueous dispersion of the resin.

The foregoing examples illustrate the far superior foam to foil bonds of the structures of this invention in comparison to foam to foil bonds in which no adhesive as described herein is used.

It is also illuminating to compare the results in the foregoing examples with results obtained in U.S. Pat. No. 3,467,569. In Examples 1 and 2 of that patent, laminate structures were prepared using a pre-formed polystyrene form core, ethylene/acrylic acid copolymer adhesive, high density polyethylene and aluminum foil. The laminate structure was polystyrene/adhesive/polyethylene/adhesive/aluminum foil. The assembly was formed by heating at 350° F. under pressure of 10 psi for twenty seconds. Despite these rigorous conditions, the highest peel strength recorded for the laminate structure was 1 lb/in.

What is claimed is:

1. A laminate structure comprising a core in the form of a foamed polyurethane or polyisocyanurate resin and a facer material bonded to at least one face of the core with an adhesive material comprising a material having functional groups selected from acid groups, hydroxyl groups, amide groups and amine groups which groups are capable of interacting chemically with isocyanate groups in the polurethane or polyisocyanurate resin, the peel strength of the bond between the core and the facer material being at least about 1.5 lbs./in.

2. A laminate structure according to claim 1 where said peel strength is st least about 5 lbs/in.

3. A laminate according to claims 1 or 2 where the adhesive material comprises a material selected from α-olefin-acid copolymers, ethylene vinyl alcohol, polyamides, polyamines and phenolic resins.

4. A laminate according to claim 3 where the adhesive material comprises ethylene vinyl alcohol.

5. A laminate according to claim 3 where the adhesive material comprises an α-olefin-acid copolymer.

6. A laminate according to claim 5 where the adhesive material comprises an ethylene-methacrylic acid or ethylene-acrylic acid copolymer with an acid content of about 1 to 20 weight %.

7. A process for preparing a laminate structure of claim 1 comprising coating one side of said facer material with said adhesive material, contacting the coated side of said facer material with the prefoam chemicals for said foamed polyurethane or polyisocyanurate resin, and allowing said prefoam chemicals to foam in contact with said coated facer material.

8. The process of claim 7 where the adhesive material is extrusion coated onto the facer material.

9. A laminate structure comprising a core in the form of a foamed polyurethane or polyisocyanurate resin and a facer material bonded to at least one face of the core with an adhesive material comprising a material having functional groups groups selected from acid groups, hydroxyl groups, amide groups and amine groups which groups are capable of interacting chemically with isocyanate groups in the polyurethane or polyisocyanurate resins, said laminate structure prepared by the process comprising coating one side of said facer material with said adhesive material, contacting the coated side of sdaid facer material with the prefoam chemicals for said foamed polyurethane or polyisocyanurate resin, and allowing said prefoam chemicals to foam in contact with said coated facer material.

10. A laminate structure according to claim 9 where the peel strength of the bond between the core and the facer material is at least about 1.5 lbs/in.

11. A laminate structure according to claim 10 where said peel strength is at least about 5 lbs/in.

12. A laminate structure according to claim 9 where the adhesive material comprises a material selected from αolefin-acid copolymers, ethylene vinyl alcohol, polyamides, polyamines and phenolic resins.

13. A laminate structure according to claim 12 where the adhesive material comprises ethylene vinyl alcohol.

14. A laminate structure according to claim 12 where the adhesive material comprises an α-olefin-acid copolymer.

15. A laminate structure according to claim 14 where the adhesive material comprises an ethylene-methacrylic acid or ethylene-acrylic acid copolymer with an acid content of about 1 to 20 weight %.

* * * * *